(12) United States Patent
Shigezane

(10) Patent No.: US 10,222,263 B2
(45) Date of Patent: Mar. 5, 2019

(54) RGB VALUE CALCULATION DEVICE

(71) Applicant: Yazaki Corporation, Tokyo (JP)

(72) Inventor: Yasuyuki Shigezane, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 15/425,488

(22) Filed: Feb. 6, 2017

(65) Prior Publication Data

US 2017/0146405 A1 May 25, 2017

Related U.S. Application Data

(63) Continuation of application No. PCT/JP2015/074586, filed on Aug. 31, 2015.

(30) Foreign Application Priority Data

Sep. 10, 2014 (JP) .................................. 2014-184191

(51) Int. Cl.
*G01J 3/52* (2006.01)
*G01J 3/46* (2006.01)
*H05B 37/02* (2006.01)
*H05B 33/08* (2006.01)

(52) U.S. Cl.
CPC ................ *G01J 3/46* (2013.01); *G01J 3/462* (2013.01); *G01J 3/522* (2013.01); *H05B 33/086* (2013.01); *H05B 37/0227* (2013.01)

(58) Field of Classification Search
CPC ............................... G01J 3/46; H05B 37/0227
USPC ....................................................... 356/421
See application file for complete search history.

(56) References Cited

U.S. PATENT DOCUMENTS

| 6,072,464 A | * | 6/2000 | Ozeki | G09G 1/285 345/603 |
| 6,785,026 B1 | * | 8/2004 | Terajima | H04N 1/484 358/475 |
| 2005/0206927 A1 | * | 9/2005 | Yamada | H04N 1/4072 358/1.9 |
| 2005/0213128 A1 | * | 9/2005 | Imai | H04N 1/6077 358/1.9 |

(Continued)

FOREIGN PATENT DOCUMENTS

| JP | 2009-163924 A | 7/2009 |
| JP | 2010-505225 A | 2/2010 |
| JP | 2012-133985 A | 7/2012 |

OTHER PUBLICATIONS

Japanese Office Action for the related Japanese Patent Application No. 2014-184191 dated Apr. 27, 2017.

(Continued)

*Primary Examiner* — Sunghee Y Gray
(74) *Attorney, Agent, or Firm* — Kenealy Vaidya LLP

(57) ABSTRACT

A microcomputer equally divides the circumference of a RGB circle into 6×n (n is an integer of 1 or more) parts, and calculates a RGB value of each divided color. (255, 0, 0) is stored as a reference RGB value of a reference color in a ROM in the microcomputer. The microcomputer 3 converts the reference RGB value depending on an angular difference on the RGB circle between a designated color whose RGB value is to be found and the reference color, and assumes the converted RGB value as a RGB value of the designated color.

17 Claims, 4 Drawing Sheets

(56) References Cited

U.S. PATENT DOCUMENTS

2008/0025603 A1* 1/2008 Sasazawa ............ H04N 1/6077
  382/167
2010/0053198 A1 3/2010 Vinkenvleugel et al.

OTHER PUBLICATIONS

International Search Report and Written Opinion of the International Search Report for PCT/JP2015/074586 dated Nov. 17, 2015.

* cited by examiner

RGB VALUE CALCULATION DEVICE

TECHNICAL FIELD

The present invention relates to a RGB value calculation device for finding a RGB value of a desired color.

BACKGROUND ART

An illumination unit for emitting lights with various colors has been conventionally proposed (Patent Literature 1, for example). The illumination unit includes an R (red) light source, a G (green) light source, and a B (blue) light source, and can change illumination colors by adjusting luminance of each light source.

In the illumination unit, a table of RGB values corresponding to each illumination color is stored, and a microcomputer for controlling the light sources reads a RGB value of a desired illumination color from the table, and adjusts the luminance of the light sources according to the read RGB value.

CITATION LIST

Patent Literature

Patent Literature 1: JP 2012-133985 A

SUMMARY OF INVENTION

Technical Problem

In the conventional illumination unit, however, a RGB value needs to be stored per illumination color and a capacity of a ROM storing the table therein increases for reproducing various colors, and thus there is a problem that other functions are eliminated or a microcomputer with a large capacity of the ROM is required.

It is therefore an object of the present invention to provide a RGB value calculation device capable of eliminating a table and using a microcomputer with a smaller capacity of a ROM.

Solution to Problem

In order to solve the above issue, a first aspect of the present invention is a RGB value calculation device for equally dividing a circumference of a RGB circle into 6×n (n is an integer of 1 or more) parts and calculating a RGB value of each divided color, including: a reference RGB value storage means for storing RGB values of one or more reference colors as reference RGB values; and a RGB value calculation means for converting the reference RGB value depending on an angular difference on the RGB circle between a designated color whose RGB value is to be found and the reference color, and assuming the converted RGB value as a RGB value of the designated color.

A second aspect is the RGB value calculation device according to the first aspect, wherein a RGB value in which any one of R-value, G-value, and B-value is a maximum value and the remaining two have the same value is assumed as a reference RGB value of a reference color, and each of the colors is attached with a color number of an integer increasing or decreasing in one way of the circumference of the RGB circle assuming a color on a line connecting the reference color and a center of the RGB circle as a (a is any integer), a first range calculation means for finding a RGB value of a color number in a first range which is within 60° in one way of the circumference from the color number a is further provided, the first range calculation means finds a RGB value of a color number p by adding $V_{max}/n \times |p-a|$ ($V_{max}$ is the maximum number of representations of R-value, G-value, and B-value, and p is any of the color numbers in the first range) to one predetermined value of R-value, G-value, and B-value of the reference RGB value, and when a color number m of the designated color is in the first range, the RGB value calculation means assumes the RGB value found by the first range calculation means as a RGB value of the designated color.

A third aspect is the RGB value calculation device according to the first aspect, wherein a RGB value in which any one of R-value, G-value, and B-value is a maximum value and the remaining two have the same value is assumed as a reference RGB value of a reference color, and each of the colors is attached with a color number of an integer increasing or decreasing in one way of the circumference of the RGB circle assuming a color on a line connecting the reference color and a center of the RGB circle as a (a is any integer), all the colors within 60° in one way of the circumference from the reference color are assumed as reference colors, and RGB values of the reference colors are stored as the reference RGB values in the reference RGB value storage means, a first range calculation means for finding a RGB value of a color number in a first range within 60° in one way of the circumference from the color number a is further provided, the first range calculation means selects one of a plurality of reference RGB values stored in the reference RGB value storage means depending on a color number m of the designated color thereby to find the reference RGB value as a RGB value of a color number in the first range, and when a color number m of the designated color is in the first range, the RGB value calculation means assumes the RGB value found by the first range calculation means as a RGB value of the designated color.

A fourth aspect is the RGB value calculation device according to the second or third aspect, wherein a radius of the RGB circle is divided by the number of saturation grades r (r is an integer), and an integer increasing or decreasing toward the center of the RGB circle is attached as a saturation parameter q assuming an outermost circumference of the RGB circle as b (b is an integer), a parameter storage means for storing the saturation parameter q and the number of saturation grades r is further provided, and the first range calculation means finds a RGB value of a color number in the first range by adding $(n-p)/n \times V_{max}/r \times |q-b|$ to one predetermined value of R-value, G-value, and B-value of a RGB value found from the reference RGB value and adding $V_{max}/r \times |q-b|$ to one of the others.

A fifth aspect is the RGB value calculation device according to any one of the second to fourth aspects, wherein when a color number m of the designated color is in a second range to which the first range is inverted by 180°, the RGB value calculation means finds a RGB value of a color number (k+a) (k is the remainder of $|m-a|/n$) by the first range calculation means, and inverts the found RGB value to be a RGB value of the designated color.

A sixth aspect is the RGB value calculation device according to any one of the second to fifth aspects, wherein when a color number m of the designated color is in a third or fourth range to which the first range is shifted by 120° in both ways of the circumference, the RGB value calculation means finds a RGB value of a color number (k+a) (k is the remainder of $|m-a|/n$) by the first range calculation means, and replaces R-value, G-value, and B-value of the found RGB value to be a RGB value of the designated color.

A seventh aspect is the RGB value calculation device according to any one of the second to sixth aspects, wherein when a color number m of the designated color is in a fifth or sixth range to which the first range is shifted by 60° in both ways of the circumference, the RGB value calculation means finds a RGB value of a color number (k+a) (k is the remainder of |m−a|/n) by the first range calculation means, and inverts and replaces the found RGB value to be a RGB value of the designated color.

Advantageous Effects of Invention

As described above, according to the first aspect, only a reference RGB value may be stored and RGB values corresponding to all the colors do not need to be stored, and thus a microcomputer with a smaller capacity of a ROM can be used.

According to the second aspect, $V_{max}/n \times |p-a|$ is only added to any one of R-value, G-value, and B-value of a reference RGB value thereby to easily find a RGB value of a color in the first range.

According to the third aspect, one of the reference RGB values stored in the reference RGB value storage means is selected thereby to easily find a RGB value of a color in the first range.

According to the fourth aspect, the saturation parameter q is adjusted thereby to adjust contrast of a color.

According to the fifth aspect, a RGB value calculated by the first range calculation means is only inverted thereby to easily find a RGB value of a color in the second range.

According to the sixth aspect, R-value, G-value, and B-value of a RGB value calculated by the first range calculation means are only replaced thereby to easily find a RGB value of a color in the third or fourth range.

According to the seventh aspect, a RGB value calculated by the first range calculation means is only inverted and replaced thereby to easily find a RGB value of a color in the fifth or sixth range.

DESCRIPTION OF EMBODIMENTS

First Embodiment

Figure 1:
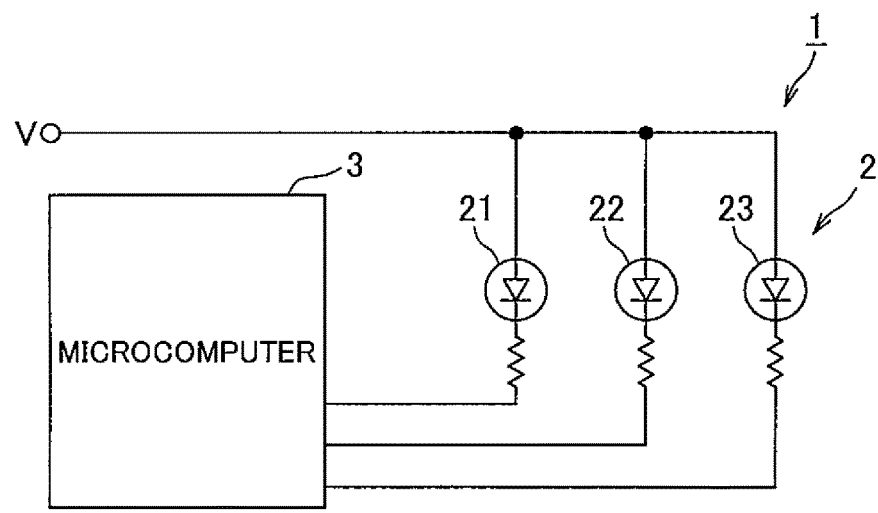
FIG. 1 is a circuit diagram illustrating one embodiment of an illumination unit incorporating a RGB value calculation device according to the present invention therein.

An illumination unit incorporating a RGB value calculation device according to the present invention therein according to a first embodiment will be described below with reference to FIG. 1. As illustrated, the illumination unit 1 is configured of an illumination load 2 arranged at each unit in a vehicle, for example, and a microcomputer 3 for controlling the illumination load 2.

The illumination load 2 is configured of an R (red) light source 21, a G (green) light source 22, and a B (blue) light source 23, and independently adjusts luminance of the R light source 21, the G light source 22, and the B light source thereby to change an illumination color.

The microcomputer 3 is configured of a CPU, a ROM, and a RAM which are well known. Ends of the light sources 21 to 23 are connected to a power supply, and the other ends thereof are connected to the microcomputer 3. The microcomputer 3 outputs a pulse-shaped control signal to the light sources 21 to 23, respectively. The microcomputer 3 adjusts duty of the control signal thereby to adjust the luminance of the light sources 21 to 23.

Figure 2:
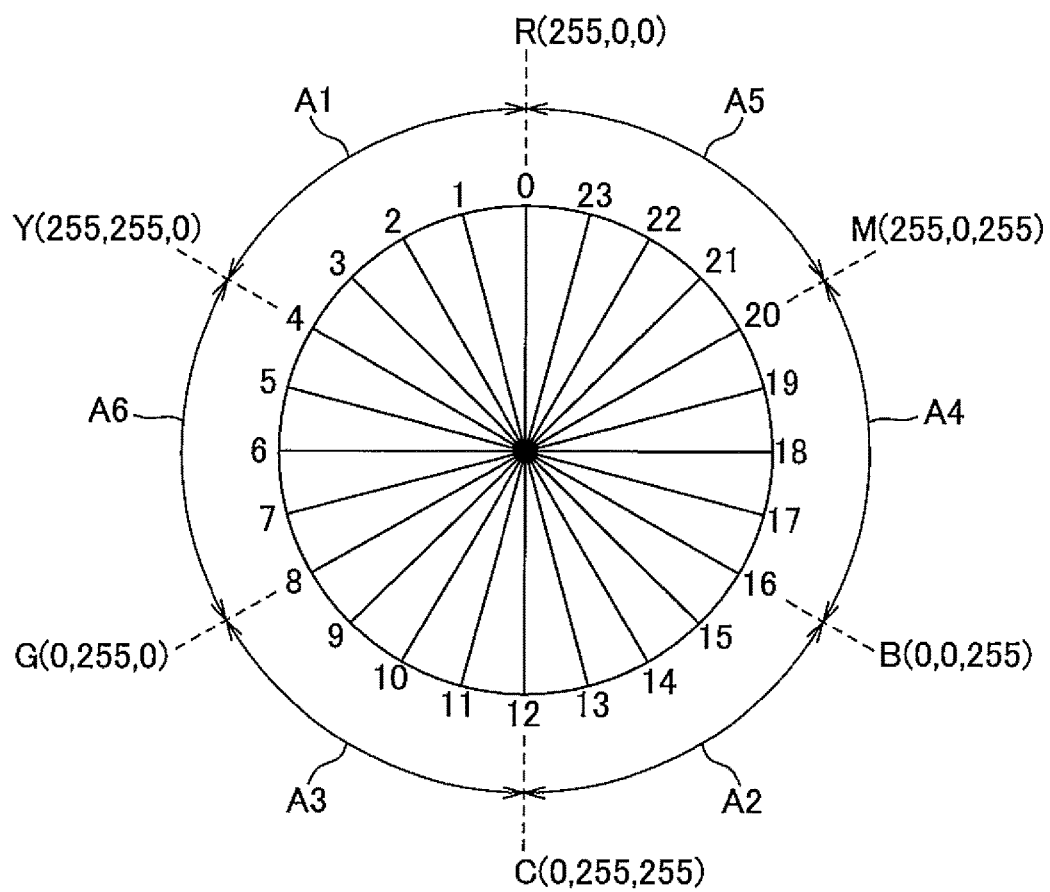
FIG. 2 is a graph illustrating a RGB circle according to a first embodiment.

A RGB value calculation method according to the present invention will be described by use of a RGB circle illustrated in FIG. 2 before the operations of the microcomputer 3 configuring the illumination unit 1 described above is described. As illustrated, R (red), G (green), and B (blue) can be arranged to be separated from each other by 120° on the circumference of the RGB circle. A RGB value of R (red) can be represented as (255, 0, 0). 255 is a maximum value of R-value, G-value, and B-value. G-value is higher in the counterclockwise tune from R (red) and G-value reaches the maximum at 60° in the counterclockwise turn from R (red) so that the RGB value is (255, 255, 0). A color at this time is Y (yellow). Further, R-value is lower in the counterclockwise turn from Y (yellow) and R-value reaches the minimum at 60° in the counterclockwise turn from Y (yellow) so that the RGB value is (0, 255, 0). A color at this time is G (green).

Further, B-value is higher in the counterclockwise turn from G (green) and B-value reaches the maximum at 60° in the counterclockwise turn from G (green) so that the RGB value is (0, 255, 255). A color at this time is C (cyan). Further, G-value is lower in the counterclockwise turn from C (cyan) and G-value reaches the minimum at 60° in the counterclockwise turn from C (cyan) so that the RGB value is (0, 0, 255). A color at this time is B (blue).

Further, R-value is higher in the counterclockwise turn from B (blue) and R-value reaches the maximum at 60° in the counterclockwise turn from B (blue) so that the RGB value is (255, 0, 255). A color at this time is M (magenta). Further, B-value is lower in the counterclockwise turn from M (magenta) and B-value reaches the minimum at 60° in the counterclockwise turn from M (magenta) so that the RGB value is (255, 0, 0). A color returns to R (red).

The operations of the microcomputer 3 configuring the illumination unit will be described below. The microcomputer 3 divides the circumference of the RGB circle illustrated in FIG. 2 into 6×(n=4) parts, and calculates a RGB value of each divided color. That is, the microcomputer 3 calculates the RGB values of 6×4 colors. The RGB values of the 6×4 colors can be represented in a final development table indicated in Table 1.

TABLE 1

| | Color number | Final development table | | | Development | |
| --- | --- | --- | --- | --- | --- | --- |
| | | R | G | B | Area | method |
| R | 0 | 255 | 0 | 0 | A1 | Rb → R |
| | 1 | 255 | 64 | 0 | | Gb → G |
| | 2 | 255 | 128 | 0 | | Bb → B |
| | 3 | 255 | 192 | 0 | | |
| Y | 4 | 255 | 255 | 0 | A6 | Gb → R |
| | 5 | 191 | 255 | 0 | | Bd → G |

TABLE 1-continued

| | Color number | Final development table | | | Development | |
| --- | --- | --- | --- | --- | --- | --- |
| | | R | G | B | Area | method |
| | 6 | 127 | 255 | 0 | | Rb → B |
| | 7 | 63 | 255 | 0 | | |
| G | 8 | 0 | 255 | 0 | A3 | Bb → R |
| | 9 | 0 | 255 | 64 | | Rb → G |
| | 10 | 0 | 255 | 128 | | Gb → B |
| | 11 | 0 | 255 | 192 | | |
| C | 12 | 0 | 255 | 255 | A2 | Rd → R |
| | 13 | 0 | 191 | 255 | | Gd → G |
| | 14 | 0 | 127 | 255 | | BD → B |
| | 15 | 0 | 63 | 255 | | |
| B | 16 | 0 | 0 | 255 | A4 | Gb → R |
| | 17 | 64 | 0 | 255 | | Bb → G |
| | 18 | 128 | 0 | 255 | | Rb → B |
| | 19 | 192 | 0 | 255 | | |
| M | 20 | 255 | 0 | 255 | A5 | Bd → R |
| | 21 | 255 | 0 | 191 | | Rd → G |
| | 22 | 255 | 0 | 127 | | Gd → B |
| | 23 | 255 | 0 | 63 | | |

According to the conventional technique, the final development table indicated in Table 1 is stored in the ROM in the microcomputer 3. To the contrary, according to the present embodiment, one of the 6×4 colors is assumed as reference color, and the RGB value of the reference color is stored as reference RGB value in the ROM (=RGB value storage means). The microcomputer 3 converts the reference RGB value according to an angular difference on the RGB circle between a designated color whose RGB value is to be found and the reference color, and assumes the converted RGB value as RGB value of the designated color. That is, according to the present embodiment, the microcomputer 3 converts the reference RGB value thereby to create the final development table as indicated in Table 1.

The details will be further described. According to the present embodiment, it is assumed that a reference color is R (red) and a reference RGB value is ($R_{max}$=255, 0, 0) ($R_{max}$ is a maximum R-value). Further, each divided color on the RGB circle is attached with a color number of an integer which increments by one in the counterclockwise turn (=in one way of the circumference) of the RGB circle assuming R (red) at 0 (=a).

The microcomputer 3 operates as first range calculation means and RGB value calculation means, and adds $V_{max}/n \times m$ (=$V_{max}/n \times |m-a|$) to G-value of the reference RGB value to be a RGB value of a designated color when a color number m of the designated color is in a first range A1 within 60° in the counterclockwise turn from the color number 0 (or m is between 0 and 3). $V_{max}$ is the maximum number of representations of R-value, G-value, and B-value. Thereby, as indicated below in Table 2, a basic table representing the RGB values of the color numbers 0 to 1 can be acquired. According to the present embodiment, R-value, G-value, and B-value can be represented by the integers between 0 to 255, and thus $V_{max}$=256 is assumed.

TABLE 2

| Color number | Initial development table Basic table | | |
| --- | --- | --- | --- |
| | Rb | Gb | Bb |
| 0 | 255 | 0 | 0 |
| 1 | 255 | 64 | 0 |
| 2 | 255 | 128 | 0 |
| 3 | 255 | 192 | 0 |

TABLE 2-continued

| Color number | Inversion table | | |
| --- | --- | --- | --- |
| | Rb | Gb | Bb |
| 12 | 0 | 255 | 255 |
| 13 | 0 | 191 | 255 |
| 14 | 0 | 127 | 255 |
| 15 | 0 | 63 | 255 |

That is, as is clear from Table 1, Rb, Gb, and Bb in the basic table are to be R, G, and B, respectively, for the RGB values of the color numbers 0 to 1.

When a difference between a color number m of a designated color and the color number 0 is less than n, the microcomputer 3 may determine that the color number m of the designated color is in the first range A1, or may make a determination based on the quotient obtained by dividing the color number m of the designated color by n. According to the present embodiment, the microcomputer 3 may determine that a color number m of a designated color is in the first range A1 when the value obtained by dividing the color number m of the designated color by n=4 is 0.

Further, when a color number m of a designated color is in a second range A2 to which the first range A1 is inverted by 180° (or m is between 12 and 15), the microcomputer 3 finds a RGB value of a color number k (=k+a) (k is the remainder of m(=|m−a|)/n), and performs bit inversion on R-value, G-value, and B-value of the found RGB value to be a RBG value of the designated color.

According to the present embodiment, the microcomputer 3 may determine that a color number m of a designated color is in the second range A2 when the value obtained by dividing the color number m of the designated color by n=4 is 3. Further, the microcomputer 3 adds $V_{max}/n \times k$ to G-value of the reference RGB value to be a RGB value of a color number k as described above. Thereby, as indicated in Table 2, an inversion table representing the RGB values of the color numbers 12 to 15 can be acquired.

That is, as is clear from Table 1, Rd, Gd, and Bd in the inversion table are to be R, G, and G, respectively, for the RGB values of the color numbers 12 to 15. The basic table and the inversion table are denoted as initial development table.

Further, when a color number m of a designated color is in a third range A3 to which the first range A1 is shifted by 120° in the counterclockwise turn (or m is between 8 and 11), the microcomputer 3 finds a RGB value of a color number k, and replaces R-value, G-value, and B-value of the found RGB value to be a RGB value of the designated color.

According to the present embodiment, the microcomputer 3 determines that a color number m of a designated color is in the third range A3 when the value obtained by dividing the color number m of the designated color by n=4 is 2. Further, the microcomputer 3 adds $V_{max}/n \times k$ to G-value of the reference RGB value to find a RGB value of a color number k, replaces B-value of the found RGB value of the color number k with R-value, replaces R-value with G-value, and replaces G-value with B-value. That is, as is clear from Table 1, Bb, Rb, and Gb in the basic table are replaced with R, G, and B, respectively, for the RGB values of the color numbers 8 to 11.

Further, when a color number m of a designated color is in a fourth range A4 to which the first range A1 is shifted by 120° in the clockwise turn (or m is between 16 and 19), the microcomputer 3 finds a RGB value of a color number k, and replaces R-value, G-value, and B-value of the found RGB value to be a RGB value of the designated color.

According to the present embodiment, the microcomputer 3 determines that a color number m of a designated color is in the fourth range A4 when the value obtained by dividing the color number m of the designated color by n=4 is 4. Further, the microcomputer 3 adds $V_{max}/n \times k$ to G-value of the reference RGB value to find a RGB value of a color number k as described above, replaces G-value of the found RGB value of the color number k with R-value, replaces B-value with G-value, and replaces R-value with B-value. That is, as is clear from Table 1, Gb, Bb, and Rb in the basic table are replaced with R, G, and B, respectively, for the RGB values of the color numbers 16 to 19.

Further, when a color number m of a designated color is in a fifth range A5 to which the first range A1 is shifted by 60° in the clockwise turn (or m is between 20 and 23), the microcomputer 3 finds a RGB value of a color number k, and inverts and replaces R-value, G-value, and B-value of the found RGB value to be a RGB value of the designated color.

According to the present embodiment, the microcomputer 3 determines that a color number m of a designated color is in the fifth range A5 when the value obtained by dividing the color number m of the designated color by n=4 is 5. Further, the microcomputer 3 adds $V_{max}/n \times k$ to G-value of the reference RGB value to find a RGB value of a color number k as described above, inverts the found R-value, G-value, and B-value of the color number k, replaces B-value with R-value, replaces R-value with G-value, and replaces G-value with B-value. That is, as is clear from Table 1, Bd, Rd, and Gd in the inversion table are replaced with R, G, and B, respectively, for the RGB values of the color numbers 20 to 23.

Further, when a color number m of a designated color is in a sixth range A6 to which the first range A1 is shifted by 60° in the counterclockwise turn (or m is between 4 and 7), the microcomputer 3 finds a RGB value of a color number k, inverts and replaces R-value, G-value, and B-value of the found RGB value to be a RGB value of the designated color.

According to the present embodiment, the microcomputer 3 determines that a color number m of a designated color is in the sixth range A6 when the value obtained by dividing the color number m of the designated color by n=4 is 1. Further, the microcomputer 3 adds $V_{max}/n \times k$ to G-value of the reference RGB value to find a RGB value of a color number k as described above, inverts the found R-value, G-value, and B-value of the color number k, replaces G-value with R-value, replaces B-value with G-value, and replaces R-value with B-value. That is, as is clear from Table 1, Gd, Bd, and Rd in the inversion table are replaced with R, G, and B, respectively, for the RGB values of the color numbers 4 to 7.

Figure 3:
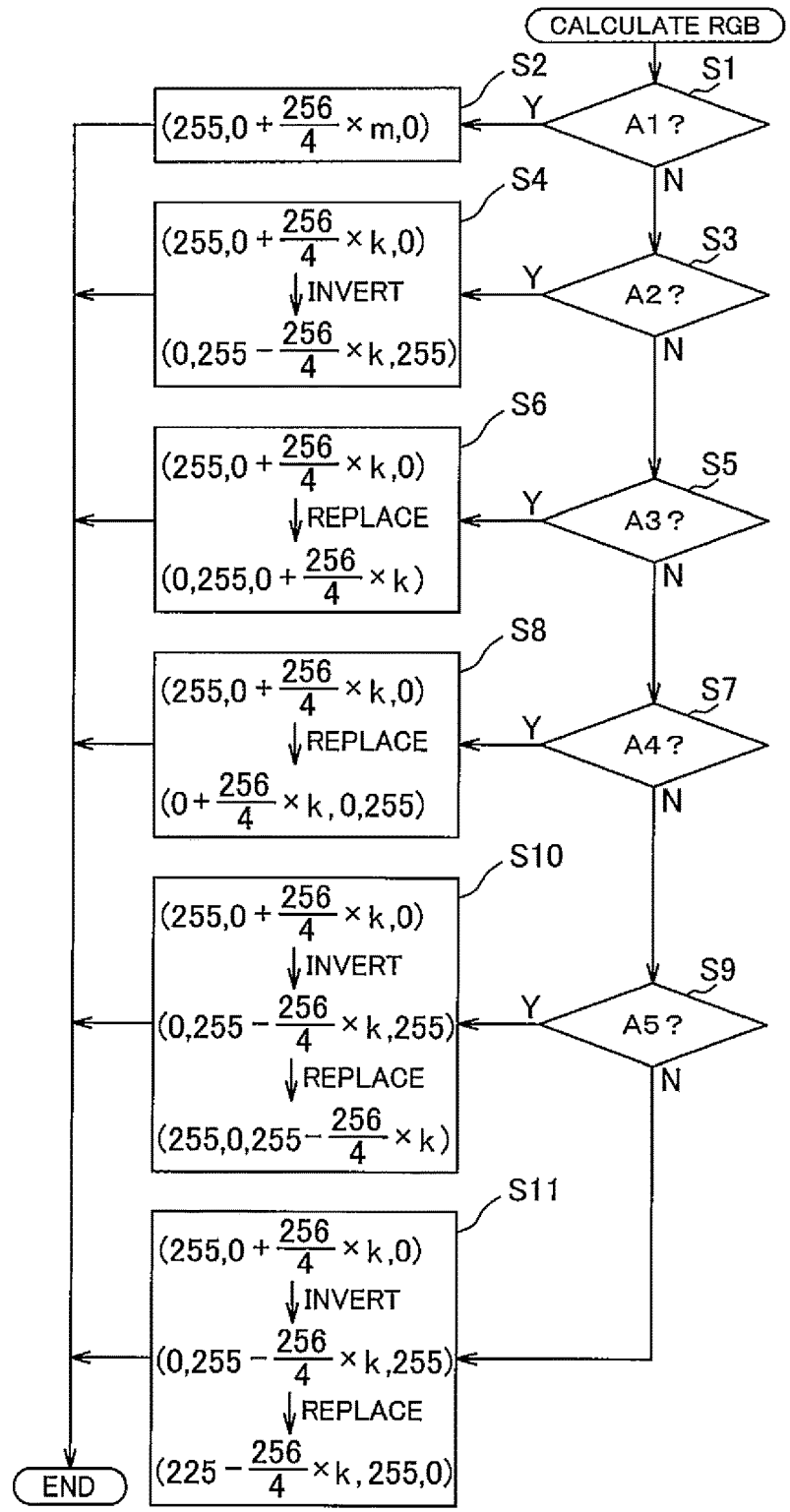
FIG. 3 is a flowchart illustrating an operation procedure of a microcomputer illustrated in FIG. 1 according to the first embodiment.

The RGB value calculation operation of the microcomputer 3 schematically described above will be described below in detail with reference to the flowchart illustrated in FIG. 3. At first, the microcomputer 3 starts the processing illustrated in FIG. 3 when calculating a RGB value of a color number m of a designated color. The microcomputer 3 determines which area a color number m is in. According to a determination method, an area can be found by a value obtained by dividing a color number by n as described above, for example.

When determining that the color number m is in the first area A1 (Y in step S1), the microcomputer 3 calculates a RGB value of the designated color to be (255, 0+256/n·m, 0) in which 256/4·m is added to G-value of the reference RGB value (255, 0, 0) (step S2). On the other hand, when determining that the color number m is in the second area A2 (Y in step S3), the microcomputer 3 finds a RGB value of a color number k to be (255, 0+256/4·k, 0) in which 256/4·k is added to G-value of the reference RGB value (255, 0, 0), and assumes the RGB value (0, 255−256/4·k, 255) to which the found RGB value is bit-inverted as RGB value of the designated color (step S4).

When determining that the color number m is in the third area A3 (Y in step S5), the microcomputer 3 finds a RGB value of a color number k to be the RGB value (255, 0+256/4·k, 0) in which 256/n·k is added to G-value of the reference RGB value (255, 0, 0), and further assumes the RGBvalue (0, 255, 0+256/4·k) of the replaced R-value, G-value, and B-value as RGB value of the designated color (step S6). On the other hand, when determining that the color number m is in the fourth area A4 (Y in step S7), the microcomputer 3 finds a RGB value of a color number k to be the RGB value (255, 0+256/4·k, 0) in which 256/n·k is added to G-value of the reference RGB value (255, 0, 0), and assumes the RGBvalue (0+256/4·k, 0, 255) of the replaced R-value, G-value, and B-value as RGB value of the designated color (step S8).

On the other hand, when determining that the color number m is in the fifth area A5 (Y in step S9), the microcomputer 3 finds a RGB value of a color number k to be the RGB value (255, 0+256/4·k, 0) in which 256/n·k is added to G-value of the reference RGBvalue (255, 0, 0), further finds the RGB value (0, 255−256/4·k, 255) of the inverted R-value, G-value, and B-value, and further assumes the RGB value (255, 0, 255−256/4·k) of the replaced R-value, G-value, and B-value as RGB value of the designated color (step S10). On the other hand, when determining that the color number m is in the sixth area A6 (N in step S9), the microcomputer 3 finds a RGB value of a color number k to be the RGB value (255, 0+256/4·k, 0) in which 256/n·k is added to G-value of the reference RGB value (255, 0, 0), further finds the RGB value (0, 255−256/4·k, 255) of the inverted R-value, G-value, and B-value, and assumes the RGB value (255−256/4·k, 255, 0) of the replaced R-value, G-value, and B-value as RGB value of the designated color (step S11).

According to the first embodiment described above, only the reference RGB value may be stored in the ROM and the RGB values corresponding to all the colors do not need to be stored therein, and thus the microcomputer with a smaller capacity of the ROM can be used. Further, the areas of the ROM and the RAM are not compressed and thus the functions thereof can be realized without eliminating other function. More specifically, while the ROM with a capacity of 300 Bytes is required for a table of 100 colors, the capacity of the ROM and the area of the RAM can be reduced to 3 Bytes and 7 Bytes for storing the reference RGB value, respectively, in the microcomputer 3 according to the first embodiment.

Further, according to the first embodiment described above, $1 \times V_{max}/n \times p$ (p is a color number in the first range A1) is only added to G-value of the reference RGB value thereby to easily find a RGB value of a color in the first range A1.

Further, according to the first embodiment described above, R-value, G-value, and B-value of a RGB value of a color number k are only inverted thereby to find a RGB value of a color in the second range A2.

Further, according to the first embodiment described above, R-value, G-value, and B-value of a RGB value of a color number k are only replaced thereby to easily find a RGB value of a color in the third or fourth range A3 or A4.

Further, according to the first embodiment described above, R-value, G-value, and B-value of a RGB value of a color number k are only inverted and replaced thereby to easily find a RGB value of a color in the fifth or sixth range A5 or A6.

Further, according to the first embodiment described above, the RGB value of the color number 0 is stored as reference RGB value in the ROM and the reference RGB value is converted to find the RGB values of the color numbers 0 to 3 in the first range A1, but the RGB value calculation is not limited thereto. For example, all the RGB values of the color number 0 to 3 may be stored as reference RGB values in the ROM (or the basic table indicated in Table 2 is stored) and one of the reference RGB values may be selected to be the RGB value of a color number k. Further, all the RGB values of the color numbers 12 to 15 may be stored as reference RGB values in the ROM (or the inversion table indicated in Table 2 is stored) and one of the reference RGB values may be selected to be the inverted RGB value of a color number k.

Second Embodiment

Figure 4:
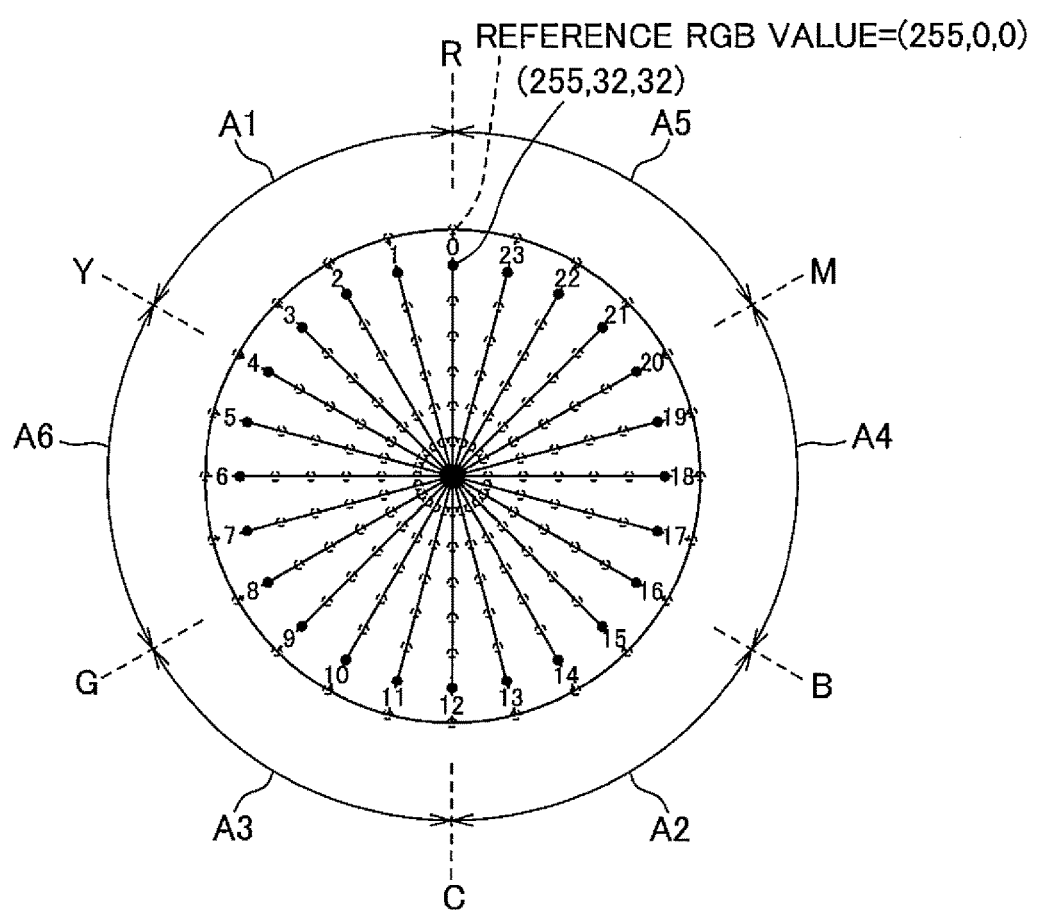
FIG. 4 is a graph illustrating a RGB circle according to a second embodiment.

A second embodiment of the present invention will be described below with reference to FIG. 4. A color has contrasting density, which can be represented in a radial direction of the RGB circle. A color is lighter toward the center of the RGB circle. According to the second embodiment, the microcomputer 3 can calculate the RGB values of the lighter 6×4 colors than the RGB values in Table 1 calculated according to the first embodiment. The RGB values of the 6×4 colors according to the second embodiment can be represented in a final development table indicated in Table 3.

TABLE 3

| Color number | Final development table | | | Development | |
|---|---|---|---|---|---|
| | R | G | B | Area | method |
| R | 0 | 255 | 32 | 32 | A1 | Rc → R |
| | 1 | 255 | 88 | 32 | | Gc → G |
| | 2 | 255 | 144 | 32 | | Bc → B |
| | 3 | 255 | 200 | 32 | | |
| Y | 4 | 255 | 255 | 32 | A6 | Ge → R |
| | 5 | 199 | 255 | 32 | | Be → G |
| | 6 | 143 | 255 | 32 | | Re → B |
| | 7 | 87 | 255 | 32 | | |
| G | 8 | 32 | 255 | 32 | A3 | Bc → R |
| | 9 | 32 | 255 | 88 | | Rc → G |
| | 10 | 32 | 255 | 144 | | Gc → B |
| | 11 | 32 | 255 | 200 | | |
| C | 12 | 32 | 255 | 255 | A2 | Re → R |
| | 13 | 32 | 199 | 255 | | Ge → G |
| | 14 | 32 | 143 | 255 | | Be → B |
| | 15 | 32 | 87 | 255 | | |
| B | 16 | 32 | 32 | 255 | A4 | Gc → R |
| | 17 | 88 | 32 | 255 | | Bc → G |
| | 18 | 144 | 32 | 255 | | Rc → B |
| | 19 | 200 | 32 | 255 | | |
| M | 20 | 255 | 32 | 255 | A5 | Be → R |
| | 21 | 255 | 32 | 199 | | Re → G |
| | 22 | 255 | 32 | 143 | | Ge → B |
| | 23 | 255 | 32 | 87 | | |

Also according to the second embodiment, (255, 0, 0) is assumed as a reference RGB value of a reference color and is stored in the ROM in the microcomputer 3. The microcomputer 3 converts the reference RGB value depending on an angular difference on the RGB circle between a designated color whose RGB value is to be found and the reference color and a distance difference between the designated color and the center of the RGB circle, and assumes the converted RGB value as RGB value of the designated color. That is, according to the present embodiment, the reference RGB value is converted thereby to create the final development table as indicated in Table 3.

TABLE 4

| Calculation NO. | First addition coefficient | Basic table | | | Corrected basic table | | |
|---|---|---|---|---|---|---|---|
| | | Rb | Gb | Bb | Rc | Gc | Bc |
| 0 | $\alpha_0 = 32$ | 255 | 0 | 0 | 255 | 32 | 32 |
| 1 | $\alpha_1 = 24$ | 255 | 64 | 0 | 255 | 88 | 32 |
| 2 | $\alpha_2 = 16$ | 255 | 128 | 0 | 255 | 144 | 32 |
| 3 | $\alpha_3 = 8$ | 255 | 192 | 0 | 255 | 200 | 32 |

Second addition coefficient = 32 = $\alpha_0$

The details will be further described. According to the present embodiment, a radius of the RGB circle is divided into r=8 (r is the number of saturation grades), the outermost circumference of the RGB circle is assumed as 0 (=b), and an integer incrementing by one toward the center is attached as saturation parameter q. According to the second embodiment, there will be described a case in which a RGB value of a color on the circumference corresponding to the saturation parameter 1 lighter by one grade than the outermost circumference of the RGB circle is found. Each divided color on the circumference lighter by one grade is attached with a color number of an integer incrementing by one in the counterclockwise turn assuming a color on a line connecting the reference color of R (red) and the center of the RGB circle at 0. According to the second embodiment, the number of saturation grades r and the saturation parameter q are stored in the ROM (=parameter storage means) in addition to the reference RGB value described above.

The microcomputer 3 first finds a calculation NO to be k (k is the remainder of m(=|m−a|)/n) of a color number m of a designated color, finds a first addition coefficient $\alpha_k$ to be $(n−k)/n \times V_{max}/r \times |q−b|$, and finds a second addition coefficient to be $V_{max}/r \times |q−b|$. The relationships between the calculation Nos (=k), and the first addition coefficients $\alpha_0$ to $\alpha_4$ and the second addition coefficient are as indicated in Table 4 (where n=4, $V_{max}$=256, r=8, and q=1). The second addition coefficient is equal to the first addition coefficient $\alpha_0$ corresponding to the calculation NO. 0.

TABLE 5

| Color number | Initial development table Corrected basic table | | |
|---|---|---|---|
| | Rc | Gc | Bc |
| 0 | 255 | 32 | 32 |
| 1 | 255 | 88 | 32 |
| 2 | 255 | 144 | 32 |
| 3 | 255 | 200 | 32 |

| | Corrected inversion table | | |
|---|---|---|---|
| | Re | Ge | Be |
| 12 | 32 | 255 | 255 |
| 13 | 32 | 199 | 255 |
| 14 | 32 | 143 | 255 |
| 15 | 32 | 87 | 255 |

The way to find a RGB value is almost similar to that of the first embodiment described above. A large difference is in the way to find a RGB value of a color number m or a color number k in the first range A1. According to the first embodiment described above, $V_{max}/n \times m$ (or k) is added to G-value of the reference RGB value to be a RGB value of the color number m or color number k. To the contrary, according to the second embodiment, $V_{max}/n \times m$ (or k) is added to G-value of the reference RGB value, and the first addition coefficient $\alpha_m$ or $\alpha_k$ is further added to G-value and the second addition coefficient $\alpha_0$ is added to B-value to be a RGB value of a color number in the first range A1. Thereby, as indicated in Table 4, a corrected basic table representing the RGB values of the color numbers 0 to 1 can be acquired.

Further, according to the first embodiment described above, R-value, G-value, and B-value of a found RGB value of a color number k are bit-inverted, respectively, thereby to invert the RGB value of the color number k. To the contrary, according to the second embodiment, R-value, G-value, and B-value of a found RGB value of a color number k are inverted, respectively, and additionally the second addition coefficient $\alpha_0$ is added to R-value, G-value, and B-value thereby to invert the RGB value of the color number k. Thereby, a corrected inversion table representing the RGB values of the color numbers 12 to 15 as indicated below in Table 5 can be acquired.

Figure 5:
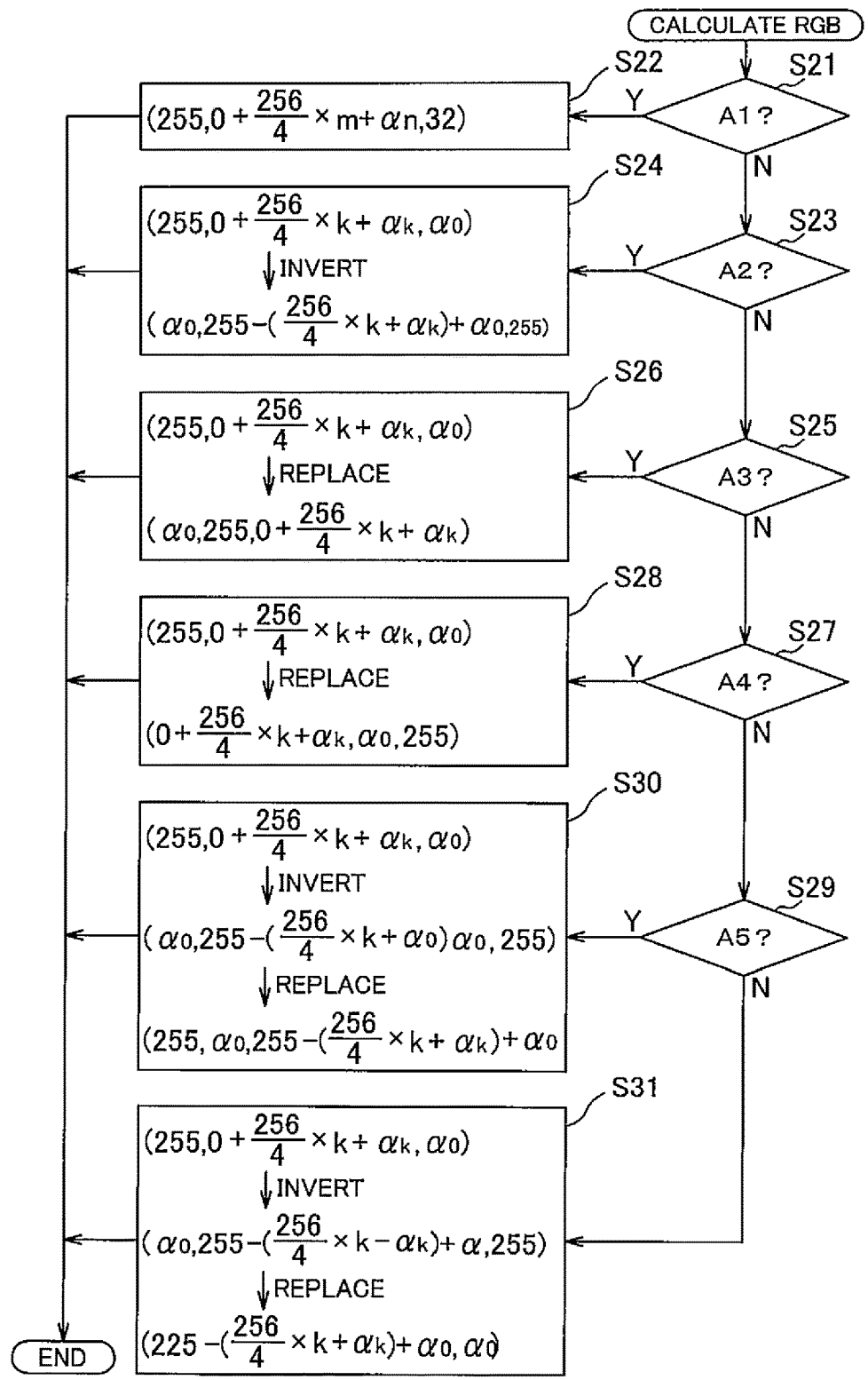
FIG. 5 is a flowchart illustrating an operation procedure of the microcomputer illustrated in FIG. 1 according to the second embodiment.

The RGB value calculation operation of the microcomputer 3 schematically described above will be described below in detail with reference to the flowchart of FIG. 5. At first, the microcomputer 3 starts the processing illustrated in FIG. 5 when calculating a RGB value of a color number m of a designated color. The microcomputer 3 determines which area the color number m is in. According to a determination method, an area can be found by a value obtained by dividing a color number by n as described above.

When determining that the color number m is in the first area A1 (Y in step S21), the microcomputer 3 calculates a RGB value of the designated color to be (255, 0+256/4·m+$\alpha_m$, $\alpha_0$) in which 256/4·m is added to G-value of the reference RGB value (255, 0, 0), $\alpha_m=(4-m)/4 \times 256/8$ is further added to G-value, and $\alpha_0=32$ is added to B-value (step S22). That is, as is clear from Table 3, Rc, Gc, and Bc in the corrected basic table are to be R, G, and B, respectively, for the RGB values of the color number 0 to 1.

On the other hand, when determining that the color number m is in the second area A2 (Y in step S23), the microcomputer 3 finds a RGB value of a color number k to be (255, 0+256/4·k+$\alpha_k$, $\alpha_0$) in which 256/4·k is added to G-value of the reference RGB value (255, 0, 0), $\alpha_k=(4-k)/4 \times 256/8$ is further added to G-value, and $\alpha_0=32$ is added to B-value, and further assumes the RGB value ($\alpha_0$, 255−(256/4·k+$\alpha_k$)+$\alpha_0$, 255) in which the respective values of the found RGB value are subjected to bit inversion and $\alpha_0$ is added to R-value, G-value, and B-value as RGB value of the designated color (step S24). That is, as is clear from Table 3, Re, Ge, and Be in the corrected inversion table are to be R, G, and B, respectively, for the RGB values of the color numbers 12 to 15.

When determining that the color number m is in the third area A3 (Y in step S25), the microcomputer 3 finds a RGB value of a color number k to be (255, 0+256/4·k+$\alpha_k$, $\alpha_0$) in which 256/4·k is added to G-value of the reference RGB value (255, 0, 0), $\alpha_k=(4-k)/4 \times 256/8$ is further added to G-value, and $\alpha_0=32$ is added to B-value, and assumes the RGB value ($\alpha_0$, 255, 0+256/4·k+$\alpha_k$) in which R-value, G-value, and B-value are replaced as RGB value of the designated color (step S26). That is, as is clear from Table 3, Bc, Rc, and Gc in the corrected basic table are to be R, G, and B, respectively, for the RGB values of the color numbers 8 to 11.

On the other hand, when determining that the color number m is in the fourth area A4 (Y in step S27), the microcomputer 3 finds a RGB value of a color number k to be (255, 0+256/4·k+$\alpha_k$, $\alpha_0$) in which 256/4·k is added to G-value of the reference RGB value (255, 0, 0), $\alpha_k=(4-k)/4 \times 256/8$ is further added to G-value, and $\alpha_0=32$ is added to B-value, and further assumes the RGB value ($\alpha_0$, 255, 0+256/4·k+$\alpha_k$) in which R-value, G-value, and B-value are replaced as RGB value of the designated color (step S28). That is, as is clear from Table 3, Gc, Bc, and Rc in the corrected basic table are to be R, G, and B, respectively, for the RGB values of the color numbers 16 to 19.

On the other hand, when determining that the color number m is in the fifth area A5 (Y in step S29), the microcomputer 3 finds a RGB value of a color number k to be (255, 0+256/4·k+$\alpha_k$, $\alpha_0$) in which 256/4·k is added to G-value of the reference RGB value (255, 0, 0), $\alpha_k=(4-k)/4 \times 256/8$ is further added to G-value, and $\alpha_0=32$ is added to B-value, finds the RGB value ($\alpha_0$, 255−(256/4·k+$\alpha_k$)+$\alpha_0$, 255) inverted as in step S24, and further assumes the RGB value (255, $\alpha_0$, 255−(25$^6$/4·k+$\alpha_k$)+$\alpha_0$) in which R-value, G-value, and B-value are replaced as RGB value of the designated color (step S30). That is, as is clear from Table 3, Be, Re, and Ge in the corrected inversion table are to be R, G, and B, respectively, for the RGB values of the color numbers 20 to 23.

On the other hand, when determining that the color number m is in the sixth area A6 (N in step S29), the microcomputer 3 finds a RGB value of a color number k to be (255, 0+256/4·k+$\alpha_k$, $\alpha_0$) in which 256/4·k is added to G-value of the reference RGB value (255, 0, 0), $\alpha_k=(4-k)/4 \times 256/8$ is further added to G-value, and $\alpha_0=32$ is added to B-value, further finds the RGB value ($\alpha_0$, 255−(256/4·k+$\alpha_k$)+$\alpha_0$, 255) inverted as in step S24, and further assumes the RGB value (255, $\alpha_0$, 255−(256/4·k+$\alpha_k$)+$\alpha_0$) in which R-value, G-value, and B-value are replaced as RGB value of the designated color (step S30). As is clear from Table 3, Ge, Be, and Re in the corrected inversion table are to be R, G, and B, respectively, for the RGB values of the color numbers 20 to 23.

According to the second embodiment described above, the saturation parameter q is adjusted thereby to adjust contrast of a color.

Further, according to the second embodiment described above, (255, 0, 0) is stored as reference RGB value in the ROM and the reference RGB value is converted to find a RGB value of a color number k, but the RGB value calculation is not limited thereto. For example, there may be configured such that the basic table indicated in Table 4 is stored in the ROM, one of the reference RGB values configuring the basic table is selected, $\alpha_k$ is added to G-value of the selected reference RGB value and $\alpha_0$ is added to B-value thereof thereby to find a RGB value of a color number k. Further, the corrected basic table indicated in Table 4 may be stored in the ROM, and one of the reference RGB values configuring the corrected basic table may be selected to find a RGB value of a color number k.

Further, according to the first and second embodiments described above, R (red) is assumed as reference color and (255, 0, 0) is assumed as reference RGB value, but a reference color and a reference RGB value are not limited thereto. G (green) or B (blue) may be assumed as reference color, and (0, 255, 0) or (0, 0, 255) may be assumed as reference RGB value.

Further, the aforementioned embodiments are merely representative forms of the present invention, and the present invention is not limited to the embodiments. That is, the embodiments may be variously modified and accomplished without departing from the spirit of the present invention.

REFERENCE SIGNS LIST

1: Illumination unit (RGB value calculation device)
3: Microcomputer (reference RGB value storage means, RGB value calculation means, first range calculation means)

The invention claimed is:

1. A RGB value calculation device for equally dividing a circumference of a RGB circle into 6×n (n is an integer of 1 or more) parts and calculating a RGB value of each divided color, the RGB color circle being a schematic graphical representation of a plurality of colors arranged around a circumference of on a circle, the device comprising:
a controller including a processor, and a memory storage device, wherein
the memory storage device is configured to store an RGB value of at least one reference color as a reference RGB value, and
the processor is configured to,
convert the reference RGB value into a converted RGB value depending on an angular difference on the RGB circle between a designated color whose RGB value is to be determined and the at least one reference color, and
set the converted RGB value as a RGB value of the designated color such that the processor determines the RGB value of the designated color without retrieving the RGB value of the designated color from a plurality of predetermined RGB values.

2. The RGB value calculation device according to claim 1,
wherein a RGB value in which any one of R-value, G-value, and B-value is a maximum value and the remaining two have the same value is stored as the reference RGB value of the reference color, and each of the colors is attached with a color number of an integer increasing or decreasing in one way of the circumference of the RGB circle assuming a color on a line connecting the reference color and a center of the RGB circle as a (a is any integer), and
the processor is configured to,
calculate a RGB value of a first range color number p in a first range which is within 60° in one way of the circumference from the color number a by adding $V_{max}/n \times |p-a|$ ($V_{max}$ is the maximum number of representations of the R-value, the G-value, and the B-value, and p is any of the color numbers in the first range) to one predetermined value of the R-value, the G-value, and the B-value of the reference RGB value, and
when a color number m of the designated color is in the first range, set the first range color number RGB value calculated by the processor as a RGB value of the designated color.

3. The RGB value calculation device according to claim 2,
wherein a radius of the RGB circle is divided by the number of saturation grades r (r is an integer), and an integer increasing or decreasing toward the center of the RGB circle is attached as a saturation parameter q assuming an outermost circumference of the RGB circle as b (b is an integer),
the memory storage device is configured to store the saturation parameter q and the number of saturation grades r, and
the processor is configured to calculate a RGB value of a color number in the first range by adding $(n-p)/n \times V_{max}/r \times |q-b|$ to one predetermined value of the R-value, the G-value, and the B-value of the reference RGB value and adding $V_{max}/r \times |q-b|$ to one of the others.

4. The RGB value calculation device according to claim 3,
wherein when a color number m of the designated color is in a second range to which the first range is inverted by 180°, the processor is configured to,
calculate a RGB value of a second range color number (k+a) (k is the remainder of $|m-a|/n$) by $V_{max}/n \times k$,
inverts the second range color number RGB value, and
set the RGB value of the second range color number that has been inverted to be a RGB value of the designated color.

5. The RGB value calculation device according to claim 3,
wherein when a color number m of the designated color is in a third or fourth range to which the first range is shifted by 120° in both ways of the circumference, the processor is configured to,
calculate a RGB value of a third range color number (k+a) (k is the remainder of $|m-a|/n$) by $V_{max}/n \times k$,
replace each R-value, G-value, and B-value of the third range color number RGB value with a different one of the R-value, G-value, and B-value, and
set the RGB value of the third range color number that has been replaced to be a RGB value of the designated color.

6. The RGB value calculation device according to claim 3,
wherein when a color number m of the designated color is in a fifth or sixth range to which the first range is shifted by 60° in both ways of the circumference, processor is configured to,
calculate a RGB value of a fifth range color number (k+a) (k is the remainder of $|m-a|/n$) by $V_{max}/n \times k$,
invert the fifth range color number RGB value,
replace each R-value, G-value, and B-value of the fifth range color number RGB value with a different one of the R-value, G-value, and B-value, and
set the RGB value of the fifth range color number that has been inverted and replaced to be a RGB value of the designated color.

7. The RGB value calculation device according to claim 2,
wherein when a color number m of the designated color is in a second range to which the first range is inverted by 180°, the processor is configured to,
calculate a RGB value of a second range color number (k+a) (k is the remainder of $|m-a|/n$) by $V_{max}/n \times k$,
invert the second range color number RGB value, and
set the RGB value of the second range color number that has been inverted to be a RGB value of the designated color.

8. The RGB value calculation device according to claim 7,
wherein when a color number m of the designated color is in a third or fourth range to which the first range is shifted by 120° in both ways of the circumference, the processor is configured to,
calculate a RGB value of a third range color number (k+a) (k is the remainder of |m−a|/n) by $V_{max}/n \times k$,
replaces each R-value, G-value, and B-value of the third range color number RGB value with a different one of the R-value, G-value, and B-value, and
set the RGB value of the third range color number that has been replaced to be a RGB value of the designated color.

9. The RGB value calculation device according to claim 7,
wherein when a color number m of the designated color is in a fifth or sixth range to which the first range is shifted by 60° in both ways of the circumference, processor is configured to,
calculate a RGB value of a fifth range color number (k+a) (k is the remainder of |m−a|/n) by $V_{max}/n \times k$,
invert the fifth range color number RGB value,
replace each R-value, G-value, and B-value of the fifth range color number RGB value with a different one of the R-value, G-value, and B-value, and
set the RGB value of the fifth range color number that has been inverted and replaced to be a RGB value of the designated color.

10. The RGB value calculation device according to claim 2,
wherein when a color number m of the designated color is in a third or fourth range to which the first range is shifted by 120° in both ways of the circumference, the processor is configured to,
calculate a RGB value of a third range color number (k+a) (k is the remainder of |m−a|/n) by $V_{max}/n \times k$,
replace each R-value, G-value, and B-value of the third range color number RGB value with a different one of the R-value, G-value, and B-value, and
set the RGB value of the third range color number that has been replaced to be a RGB value of the designated color.

11. The RGB value calculation device according to claim 10,
wherein when a color number m of the designated color is in a fifth or sixth range to which the first range is shifted by 60° in both ways of the circumference, processor is configured to,
calculate a RGB value of a fifth range color number (k+a) (k is the remainder of |m−a|/n) by $V_{max}/n \times k$,
invert the fifth range color number RGB value,
replace each R-value, G-value, and B-value of the fifth range range color number RGB value with a different one of the R-value, G-value, and B-value, and
set the RGB value of the fifth range color number that has been inverted and replaced to be a RGB value of the designated color.

12. The RGB value calculation device according to claim 2,
wherein when a color number m of the designated color is in a fifth or sixth range to which the first range is shifted by 60° in both ways of the circumference, processor is configured to,
calculate a RGB value of a fifth range color number (k+a) (k is the remainder of |m−a|/n) by $V_{max}/n \times k$,
invert the fifth range color number RGB value,
replace each R-value, G-value, and B-value of the fifth range color number RGB value with a different one of the R-value, G-value, and B-value, and
set the RGB value of the fifth range color number that has been inverted and replaced to be a RGB value of the designated color.

13. The RGB value calculation device according to claim 1,
wherein a RGB value in which any one of R-value, G-value, and B-value is a maximum value and the remaining two have the same value is stored as the reference RGB value of the reference color, and each of the colors is attached with a color number of an integer increasing or decreasing in one way of the circumference of the RGB circle assuming a color on a line connecting the reference color and a center of the RGB circle as a (a is any integer),
all the colors within 60° in one way of the circumference from the reference color are assumed as reference colors, and RGB values of the reference colors are stored as the reference RGB values in the reference RGB value storage means, and
the processor is configured to,
when a color number in a first range within 60° in one way of the circumference from the color number a, select one of a plurality of reference RGB values stored in the reference RGB value storage means depending on a color number m of the designated color thereby to set the reference RGB value as a RGB value of first range color number, and
when a color number m of the designated color is in the first range, set the first range color number RGB value as a RGB value of the designated color.

14. The RGB value calculation device according to claim 13,
wherein a radius of the RGB circle is divided by the number of saturation grades r (r is an integer), and an integer increasing or decreasing toward the center of the RGB circle is attached as a saturation parameter q assuming an outermost circumference of the RGB circle as b (b is an integer),
the memory storage device is configured to store the saturation parameter q and the number of saturation grades r, and
the processor is configured to calculate a RGB value of a color number in the first range by adding $(n-p)/n \times V_{max}/r \times |q-b|$ to one predetermined value of the R-value, the G-value, and the B-value of the reference RGB value and adding $V_{max}/r \times |q-b|$ one of the others.

15. The RGB value calculation device according to claim 13,
wherein when a color number m of the designated color is in a second range to which the first range is inverted by 180°, the processor is configured to,
calculate a RGB value of a second range color number (k+a) (k is the remainder of |m−a|/n) by $V_{max}/n \times k$,
invert the second range color number RGB value, and
set the RGB value of the second range color number that has been inverted to be a RGB value of the designated color.

16. The RGB value calculation device according to claim 13,
wherein when a color number m of the designated color is in a third or fourth range to which the first range is shifted by 120° in both ways of the circumference, the processor is configured to, calculate a RGB value of a third range color number (k+a) (k is the remainder of |m−a|/n) by $V_{max}/n \times k$, replace each R-value, G-value, and B-value of the third range color number RGB value with a different one of the R-value, G-value, and B-value, and set the RGB value of the third range color number that has been replaced to be a RGB value of the designated color.

17. The RGB value calculation device according to claim 13, wherein when a color number m of the designated color is in a fifth or sixth range to which the first range is shifted by 60° in both ways of the circumference, processor is configured to, calculate a RGB value of a fifth range color number (k+a) (k is the remainder of |m−a|/n) by $V_{max}/n \times k$, invert the fifth range color number RGB value, replace each R-value, G-value, and B-value of the fifth range color number RGB value with a different one of the R-value, G-value, and B-value, and set the RGB value of the fifth range color number that has been inverted and replaced to be a RGB value of the designated color.

\* \* \* \* \*